May 1, 1951 J. A. COOK 2,551,245
SLIDE FASTENER CLOSURE
Filed Dec. 20, 1948
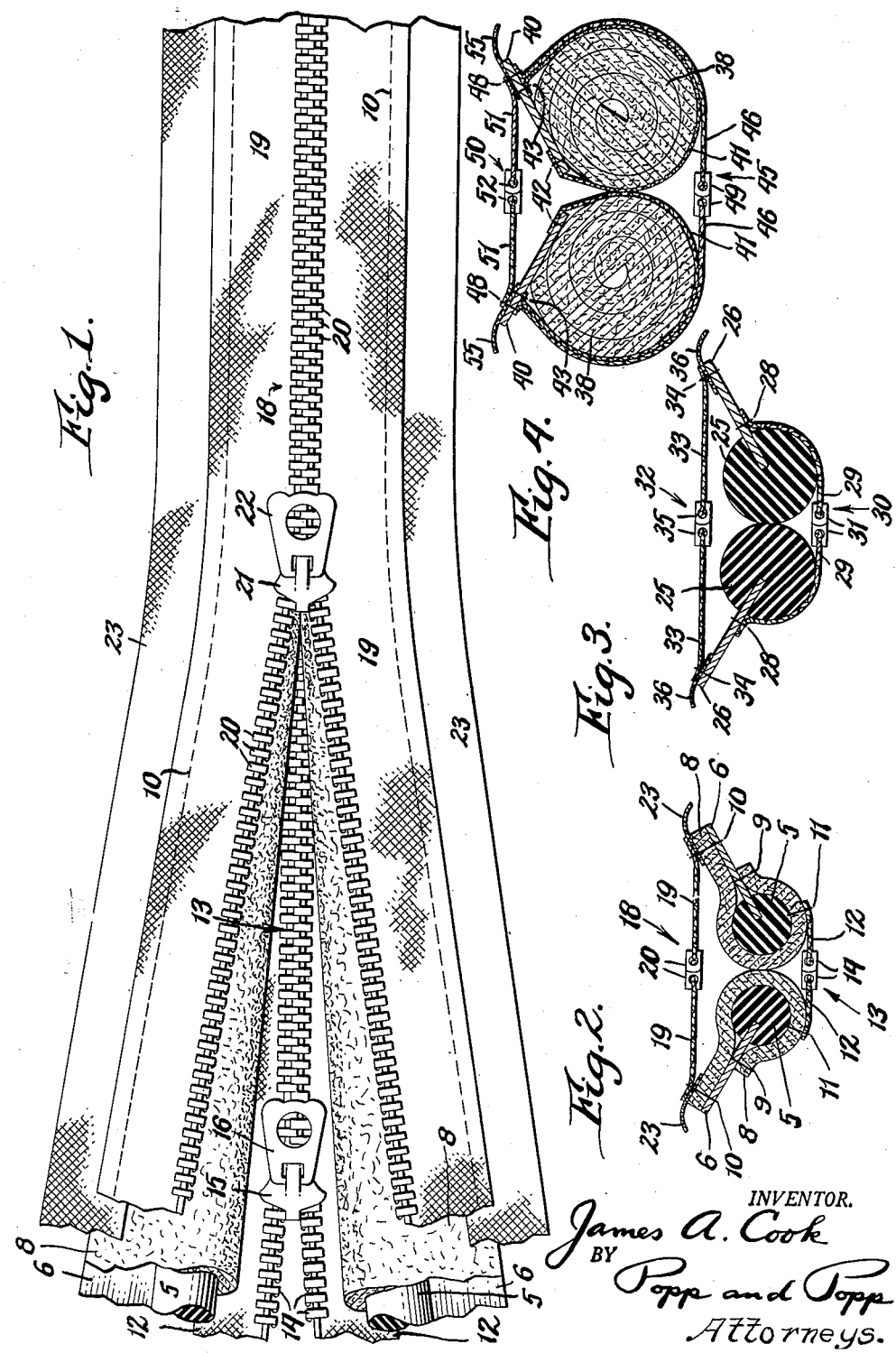
INVENTOR.
James A. Cook
BY Popp and Popp
Attorneys.

Patented May 1, 1951

2,551,245

UNITED STATES PATENT OFFICE 2,551,245

SLIDE FASTENER CLOSURE

James A. Cook, Buffalo, N. Y.

Application December 20, 1948, Serial No. 66,283

10 Claims. (Cl. 24—205.1)

This invention relates to a slide fastener closure and more particularly to such a closure which is tightly sealed to prevent the escape of liquid under pressure, to provide a fire resistance closure, to reduce the passage of heat or sound or to prevent the escape of odors. Such a tightly sealed closure finds many uses as in thermally insulated bags carrying ice and articles to be cooled or carrying heated articles or articles liable to be spilled or broken; in fire resistant bags for storing valuables; in sound proofing blankets around machinery or the like; and in applications where it is desirable to confine water under as much as seven pounds pressure.

One of the principal objects of the invention is to provide such a tightly sealed slide fastener closure in which the tight seal is obtained without strain upon the sliders and without danger of stalling the slider, this effect being obtained by the use of leverage in conjunction with the sliders.

Another important object of the invention is to provide such a tightly sealed slide fastener closure in which close tolerances do not have to be maintained in its manufacture and which is sufficiently flexible to operate properly regardless of the manufacturing tolerances maintained.

Another object is to provide such a tightly sealed slide fastener closure which can be rapidly and easily opened and closed and which can be made in any length desired.

Another object is to provide such a closure which can be made to withstand substantial water or liquid pressure without leakage thereby to adapt it to many uses where a seal against pressure is desired.

Another object is to provide such a tightly sealed closure which can be made to resist the passage of heat, sound or gases thereby to permit of its use in conjunction with thermally insulated, fire resistant or sound proofing bags and blankets.

Another object is to provide such a closure which is low in cost and which will stand up under conditions of severe and constant use without getting out of order or requiring repairs.

Other objects and advantages of the invention will appear from the following description and drawings in which:

Fig. 1 is a fragmentary top plan view of a slide operated closure embodying the present invention and showing the same partially opened.

Fig. 2 is a cross sectional view thereof showing it closed.

Figs. 3 and 4 are views similar to Fig. 2 and showing modifications of the invention.

The form of the invention shown in Figs. 1 and 2 is designed for use as a thermally or sound insulated closure such as might be used in a bag designed to carry hot or cold foodstuffs or in many other applications where a sldie fastener closure insulated against the passage of heat or sound is desired. The closure is illustrated as comprising a pair of elongated cylindrical bodies 5 extending the length of the closure in parallel relation and made of rubber or other soft resilient material. Embedded in each of these rubber bodies 5 and projecting outwardly and upwardly in diverging relation from opposite sides thereof are strips 6 of relatively stiff material which can be made of plastic impregnated fiber, metal, wood, cardboard, or of any other material sufficiently stiff to be capable of exerting leverage against the bodies 5 when the upper or projecting ends of these strips are drawn together. On the other hand, it is desirable that these strips 6 have sufficient flexibility to flex around curves and to flex somewhat in everting leverage against the rubber bodies 5, this flexibility avoiding the necessity of maintaining close tolerances in the manufacture of the closure.

The thermal or sound insulation of the closure is shown as provided by a strip 8 of sound or thermal insulation around the rubber bodies 5. These strips can be of felted fiber and each is shown as having its opposite edges secured to the corresponding strip 6 by rows of stitching 9 and 10, the intermediate part being wrapped around the corresponding rubber body 5.

To the underside of each of the thermal or sound insulation strips 8 is secured, as by a row of stitching 11, one edge of one cloth stringer 12 of an inner slide fastener indicated generally at 13. The opposing edges of the two stringers 12 carry the usual rows of spaced fastener members 14 of the type usually employed in slide fasteners and which are adapted to be coupled together by movement of a slider 15 traveling along the rows of fastener members 14 in one direction thereby to effect a fastening together of the two stringers 12. Uncoupling of the two stringers 12 is effected by a reverse movement of the slider 15. The slider 15 is provided with the usual tab 16 which is shown as pivoted to the side of the slider 15 which faces outwardly or toward the rubber bodies 5.

The numeral 18 represents an outer slide fastener comprising a pair of cloth stringers 19 each joined at its outer edge to the corresponding relatively stiff strip 6 along the outer or projecting longitudinal edge thereof by the row of stitching 10 and the opposing edges of these stringers 19 carrying the usual rows of spaced fastener members 20 of the type usually employed in slide fasteners and which are adapted to be coupled together by movement of a slider 21 traveling along the rows of fastener members 20 and adapted by movement in one direction to interengage and couple the rows of fastener members 20 and by movement in the other direction to disengage and uncouple these rows of fastener members 20. The slider 21 is provided with the usual tab 22 which is shown as pivoted to the side of the slider 21 which faces outwardly or away from the rubber bodies 5.

A cloth tape 23 is interposed between each stringer 19 and strips 8 of insulating material and secured by the row of stitching 19. The outer edge of each of these tapes 23 extends beyond the edges of the corresponding stringer 19 and strip 8 and permits of securing the closure to the mouth of the bag or end of the blanket (not shown) which the closure forming the subject of the present invention is designed to close.

In use, the closure of the present invention is secured by the tapes 23 to the mouth of the bag or other article (not shown) which the closure is designed to close, the bodies 5, strips 8, 6 and 23 and stringers 12, 19 extending the full length of this mouth. To close the closure, the user draws the slider 15 of the inner slide fastener 13 in the direction to progressively interlock the fastener member 14 at the edges of the stringers 12. The user then draws the slider 21 of the outer slide fastener 18 in the direction to progressively interlock the fastener members 20 at the edges of the stringers 19. This movement of the slider 21 draws its stringers 19 together. This draws inwardly on the outer edges of the relatively rigid strips 6. This causes these relatively rigid strips to exert a leverage action on the rubber bodies 5 and their felt coverings 8 so as to draw the opposing faces of the felt coverings 8 toward each other and effect a firm seal therebetween. The fulcrum for the levers so provided by the relatively stiff strips 6 is the line of juncture of the fastener members 14 of the lower slide fastener 13. It will be noted that the slide fastener 13 is essentially positioned in spaced relation to the line of contact of the covered bodies 5, 8 and in a plane intersected by theoretical projections of the adjacent or embedded edges of the strips 6 of relatively stiff material so that this slide fastener acts as a fulcrum for the movement of the projecting edges of these strips 6 in establishing a pressure contact between said covered bodies. As previously indicated, while the strips 6 are sufficiently stiff to provide such leverage in firmly sealing the opposing faces of the felt strips 8, they are also sufficiently flexible to yield on drawing the upper slide fastener 18 closed so that close tolerances do not have to be maintained in the manufacture of the closure.

To open the closure the user draws the slider 21 of the outer slide fastener 18 in the direction to progressively detach the opposing rows of fastener members 20 from each other. This releases the outer longitudinal edges of the relatively stiff strips 6 thereby permitting these strips to swing apart and release their leverage action on the rubber bodies 5 and felt coverings 8 and to release the seal between the opposing faces of the felt coverings 8. This release of these faces provides access to the tab 16 of the slider 15 of the inner slide fastener 13 which can then be drawn in the direction to progressively detach the opposing rows of fastener members 14 from each other. Full access through the mouth of the bag or other article closed by the closure is thereby provided.

The invention can also be employed to provide a slide fastener which will prevent the passage of fluids, such as water or gas, under pressure, this form of the invention being illustrated in Fig. 3. As there shown, the closure comprises a pair of cylindrical bodies 25 extending the length of the closure in parallel relation and made of rubber or other soft resilient material. Embedded in each of these rubber bodies 25 and projecting outwardly and upwardly from opposite sides thereof are strips 26 which can be made of the same material as the strips 6 of the form of the invention shown in Figs. 1 and 2, and likewise are sufficiently stiff to exert leverage against the rubber bodies 25 when the outer edges of these strips are drawn together and yet have sufficient flexibility to yield in exerting such leverage, and thereby avoid the necessity for close manufacturing tolerances.

To the underside of each of these relatively rigid strips 26 is secured, as by a row of stitching 28, one edge of one cloth stringer 29 of an inner slide fastener indicated generally at 30. The opposing edges of the two stringers 29 carry the usual rows of spaced fastener members 31 of the type usually employed in slide fasteners and which are adapted to be coupled together by movement of a slider (not shown) similar to the slider 15.

The numeral 32 represents an outer slide fastener comprising cloth stringers 33 each joined at its outer edge to the corresponding relatively stiff strip 26 along the outer longitudinal edge thereof by a row of stitching 34 and the opposing edges of these stringers 33 carrying the usual rows of spaced fastener members 35 of the type usually employed in slide fasteners and which are adapted to be coupled together by movement of a slider (not shown) similar to the slider 21 of the form of the invention shown in Figs. 1 and 2 and traveling along the rows of fastener members 35 to interengage and couple or to disengage and uncouple the rows of fastener members 35.

To permit of attaching the closure to the mouth of the article to be closed, a tape 36 is interposed between the outer edges of each strip 26 of relatively stiff material and the corresponding cloth stringer 33, these tapes being secured by the line of stitching 34. These tapes 36 project beyond the edges of the strips 26 and stringers 33 and permit of attaching the closure to the edges of the parts to be secured by the closure.

It will be seen that the closure shown in Fig. 3 is opened and closed in the same manner as that shown in Figs. 1 and 2 and that the relatively stiff strips 26 exert, from the fulcrum provided by the line of juncture of the fastener members 31, a leverage against the opposing faces of the rubber bodies 25, this leverage being in turn provided by the tension imposed on the stringers 33 of the outer slide fastener 32 in coupling its fastening members 35. The sealing effect between the opposing faces of the rubber bodies 25 can be made to prevent the leakage of water or gas under pressure thereby, water pressures as high as 7 pounds having been contained without leakage.

Where a closure of substantial thickness, say of four or more inches, is desired, the form of the invention shown in Fig. 4 can be employed. Such thickness would be desirable, for example, with sound insulation coverings for machinery or for fire protection. As shown in Fig. 4, the closure comprises a pair of generally cylindrical bodies 38 each formed by winding a strip of felt spirally around a longitudinal axis. These bodies or rolls 38 are arranged parallel and extend the full length of the closure. To the outer convolution of each of these rolls or bodies 38 is applied a strip 40 which can be made of the same material as the strips 6 of the form of the invention shown in Figs. 1 and 2 and likewise are sufficiently stiff to exert leverage against the rolls or bodies 38 when the outer edges of these strips are drawn together and yet have sufficient flexibility to yield in exerting such leverage and thereby avoid the necessity for close manufacturing tolerances.

Each of these rolls or bodies 38 is enclosed in a cloth cover strip 41, one edge of which is secured, as by a row of stitching 42, to the upper face of the relatively stiff strip 40, each cloth strip 41 embracing the body of the roll on being secured along its opposite edge, as by a row of stitching 43, to the under face of the same relatively rigid strip 40. As with the other forms of the invention, a lower slide fastener, indicated generally at 45, is provided, this slide fastener having a pair of cloth stringers 46 which embrace the under sides of the bodies or rolls 38 and each of which is secured along one edge, as by a row of stitching 48, to the under side of the corresponding relatively stiff strip 42 adjacent the stitching 43 for the cover strip 41. The opposing edges of the two stringers 46 carry the usual row of spaced fastener members 49 of the type usually employed in slide fasteners and which are adapted to be coupled together by movement of a slider (not shown), similar to the slider 15 in the form of the invention shown in Figs. 1 and 2.

The numeral 50 represents an outer slide fastener comprising cloth stringers 51 each joined at its outer edge to the corresponding relatively stiff strip 40 along the outer longitudinal edge thereof as by the same row of stitching 48 which also secures the corresponding stringer 46 of the lower slide fastener 45. The opposing edges of these stringers 51 carry the usual row of spaced fastener members 52 of the type usually employed in slide fasteners and which are adapted to be coupled together by movement of a slider (not shown) similar to the slider 21 of the form of the invention shown in Figs. 1 and 2 and traveling along the rows of fastener members 52 to interengage and couple or disengage and uncouple the rows of fastener members 52.

It will be seen that the closure shown in Fig. 4 is opened and closed in the same manner as that shown in Figs. 1 and 2 and that the relatively stiff strips 40 exert, from the fulcrum provided by the line of juncture of the fastener members 49, a leverage against the opposing faces of the coverings 41 for the rolls or bodies 38, this leverage being in turn provided by the tension imposed on the stringers 51 of the outer slide fastened 50 in coupling its fastening members 52. A firm seal of substantial area is thereby obtained between the opposing faces of the covered bodies or rolls 38, thereby to retard the passage of heat or sound past the closure. It will be understood that the closure shown in Fig. 5 would normally be attached to a blanket or wall of material similar to the material of which the bodies or rolls 38 are formed and of a thickness generally equal to the diameter of these rolls, the closure being provided for this purpose with a tape 55 interposed between each relatively stiff strip 40 and stringer 52 of the upper slide fastener and secured to project therefrom by the lines of stitching 43 and 48.

It will be understood that in all forms of the invention the particular material selected will depend upon the use for which the closure is designed, fire resistant fabrics and felts, such as asbestos being selected where resistance to high temperatures is desired, and lower cost materials having low thermal conductivity being selected where the invention is to be embodies in containers for hot or cold foodstuffs.

From the foregoing it will be seen that the present invention provides a simple and inexpensive slide fastener closure in which a firm seal is obtained without strain upon or danger of stalling either slider and which enables the production of closures for containers adapted to be used for protecting articles against fire, for foodstuffs or the like which are desired to be kept either hot or cold, for sound insulating blankets, or for containing fluids under pressure.

I claim:

1. A slide fastener closure comprising a pair of generally parallel elongated bodies of yielding material adapted to be drawn into engagement with each other to provide a sealed closure, an elongated lever strip of relatively stiff material extending lengthwise of and secured to each of said bodies to project laterally therefrom, said lever strips of relatively stiff material projecting in opposite directions from said bodies in divergent relation to each other and being sufficiently stiff to be capable of exerting a leverage action on said bodies, a slide fastener including a pair of elongated stringers extending along and each operatively connected to one of said bodies, rows of fastener members along opposing edges of said stringers and a slider adapted on movement along said rows to couple and uncouple said fastener members, and said slide fastener being positioned to act as a fulcrum for the movement of the outer edges of said lever strips of relatively stiff material toward each other in establishing a pressure contact between said bodies, and a second slide fastener including a second pair of elongated stringers each connected along one edge to a corresponding one of said lever strips of relatively rigid material along and adjacent the said outer edge thereof, rows of fastener members along the opposing edges of said stringers and a second slider adapted on movement along said last rows to couple and uncouple the said fastener members thereof, said second slide fastener being proportioned to draw said outer edges of said lever strip of relatively stiff material together on coupling said last rows of fastener members.

2. A slide fastener closure comprising a pair of generally parallel elongated bodies of yielding material adapted to be drawn into engagement with each other to provide a sealed closure, an elongated lever strip of relatively stiff material extending lengthwise of and secured to each of said bodies to project laterally therefrom, said lever strips of relatively stiff material projecting in opposite directions from said bodies in divergent relation to each other and being sufficiently stiff to be capable of exerting a leverage action on said bodies, a slide fastener including a pair of elongated stringers extending along and each operatively connected to one of said bodies, rows of fastener members along opposing edges of said stringers and a slider adapted on movement along said rows to couple and uncouple said fastener members and said slide fastener being positioned in spaced relation to the line of contact of said bodies and in a plane intersected by theoretrical projections of the adjacent edges of said lever strips of relatively stiff material whereby said slide fastener acts as a fulcrum for the movement of the opposite remote edges of said lever strips of relatively stiff material toward each other in establishing a pressure contact between said bodies, and a second slide fastener including a second pair of elongated stringers each connected along one edge to a corresponding one of said lever strips of relatively rigid material along and adjacent the said opposite edge thereof, rows of fastener members along the opposing edges of said second stringers and a second slider adapted on movement along said last rows to couple and uncouple the fastener members thereof, said second slide fastener being proportioned to draw said opposite edges of said lever strips of relatively stiff material together on coupling said last rows of fastener members.

3. A slide fastener closure comprising a pair of generally parallel elongated bodies of yielding material adapted to be drawn into engagement with each other to provide a sealed closure, an elongated lever strip of relatively stiff material extending lengthwise of and secured to each of said bodies to project laterally therefrom, said lever strips of relatively stiff material projecting in opposite directions from said bodies in divergent relation to each other and being sufficiently stiff to be capable of exerting a leverage action on said bodies, a slide fastener including a pair of elongated stringers extending along and each operatively connected to one of said bodies, rows of fastener members along opposing edges of said stringers and a slider adapted on movement along said rows to couple and uncouple said fastener members and said slide fastener being positioned in spaced relation to the line of contact of said bodies and in a plane intersected by theoretical projections of the adjacent edges of said lever strips of relatively stiff material whereby said slide fastener acts as a fulcrum for the movement of the opposite remote edges of said lever strips of relatively stiff material toward each other in establishing a pressure contact between said bodies, a second slide fastener including a second pair of elongated stringers each connected along one edge to a corresponding one of said elever strips of relatively rigid material along and adjacent the said opposite edge thereof, rows of fastener members along the opposing edges of said second stringers and a second slider adapted on movement along said last rows to couple and uncouple the fastener members thereof, said second slide fastener being proportioned to draw said opposite edges of said lever strips of relatively stiff material together on coupling said last row of fastener members, and a tape secured in parallel relation along the said opposite edge of each of said lever strips of relatively rigid material and projecting laterally outwardly therefrom to provide attaching tapes along opposite sides of the closure.

4. A slide fastener closure comprising a pair of generally parallel elongated rubber bodies adapted to be drawn toward each other in providing a sealed closure, a strip of relatively stiff material extending lengthwise of and having one edge embedded in each of said bodies and its opposite edge projecting laterally therefrom, said strips of relatively stiff material projecting in opposite directions from said bodies in divergent relation to each other and being sufficiently stiff to be capable of exerting a leverage action on said bodies, a slide fastener including a pair of elongated stringers extending along and each operatively connected to one of said bodies, rows of fastener members along opposing edges of said stringers and a slider adapted on movement along said rows to couple and uncouple the fastener members thereof, and said slide fastener being positioned in spaced relation to the line of closest approach of said bodies and in a plane intersected by theoretical projections of said one edges of said strips of relatively stiff material and whereby said slide fastener acts as a fulcrum for the movement of the said projecting edges of said strips of relatively stiff material toward each other in establishing pressure relation between said bodies, and a second slide fastener including a second pair of elongated stringers each connected along one edge to a corresponding one of said strips of relatively stiff material along and adjacent the said projecting edge thereof, rows of fastener members along the opposite other edges of said second stringers and a second slider adapted on movement along said last rows to couple and uncouple the fastener members thereof, said second slide fastener being proportioned to draw said projecting edges of said strips of relatively stiff material together on coupling said last rows of fastener members.

5. A slide fastener closure comprising a pair of generally elongated rubber bodies, a cover of fibrous material for each of said bodies, said covered bodies being adapted to be drawn into contact with each other in providing a sealed closure, a strip of relatively stiff material extending lengthwise of and having one edge embedded in each of said bodies and its opposite edge projecting laterally therefrom, said strips of said relatively stiff material projecting in opposite directions from said bodies in divergent relation to each other and being sufficiently stiff to be capable of exerting a leverage action on said bodies, a slide fastener including a pair of elongated stringers extending along and each operatively connected to one of said bodies, rows of fastener members along opposing edges of said stringers and a slider adapted on movement along said rows to couple and uncouple the fastener members thereof, and said slide fastener being positioned in spaced relation to the line of contact of said covered bodies and in a plane intersected by theoretical projections of said one edges of said strips of relatively stiff material whereby said slide fastener acts as a fulcrum for the movement of said projecting edges of said strips of relatively stiff material toward each other in establishing a pressure contact between said covered bodies, and a second slide fastener including a second pair of elongated stringers each connected along one edge to a corresponding one of said strips of relatively stiff material along and adjacent to said projecting edge thereof, rows of fasteners along the other edges of said second stringers and a second slider adapted on movement along said last rows to couple and uncouple the fastener members thereof, said second slide fastener being proportioned to draw said projecting edges of said strips of relatively stiff material together on coupling said last rows of fastener members.

6. A slide fastener closure comprising a pair of generally parallel elongated rubber bodies, a strip of relatively stiff material extending lengthwise of and having one edge embedded in each of said bodies and its opposite edge projecting laterally therefrom, said strips of relatively stiff material projecting in opposite directions from said bodies in divergent relation to each other and being sufficiently stiff to be capable of exerting a leverage action on said bodies, a fibrous cover for each of said bodies comprising a fibrous strip having one edge secured to one face of the corresponding strip of relatively stiff material and its opposide edge secured to the other face thereof with its intermediate part embracing the rubber body, said covered bodies being adapted to be drawn into contact with each other in providing a sealed closure, a slide fastener including a pair of elongated stringers extending along and each having one edge secured to one of said cover strips, rows of fastener members along the opposite edges of said stringers and a slider adapted on movement along said rows to couple and uncouple the fastener members thereof, and said slide fastener being positioned in spaced relation to the line of contact of said covered bodies and in a plane intersected by theoretical projections of said one edges of said strips of relatively stiff material and whereby said slide fastener acts as a fulcrum for the movement of said projecting edges of said strips of relatively stiff material toward each other in establishing a pressure contact between said covered bodies, and a second slide fastener including a second pair of elongated stringers each connected along one edge to a corresponding one of said strips of relatively stiff material along and adjacent to said projecting edge thereof, rows of fastener members along the other edges of said second stringers and a second slider adapted on movement along said last rows to couple and uncouple the fastener members thereof, said second slide fastener being proportioned to draw said projecting edges of said strips of relatively stiff material together on coupling said last rows of fastener members.

7. A slide fastener comprising a pair of generally parallel elongated rubber bodies adapted to be drawn into contact with each other to provide a sealed closure, a strip of relatively stiff material extending lengthwise of and having one edge embedded in each of said bodies and its opposite edge projecting laterally therefrom, said strips of relatively stiff material projecting in opposite directions from said bodies in divergent relation to each other and being sufficiently stiff to be capable of exerting a leverage action against said bodies, a slide fastener including a pair of elongated stringers extending along and each operatively connected to one of said bodies, rows of fastener members along opposing edges of the said stringers and a slider adapted on movement along said rows to couple and uncouple the fastener members thereof, and said slide fastener being positioned in spaced relation to the line of contact of said bodies and in a plane intersected by theoretical projections of said one edges of said strips of relatively stiff material and whereby said slide fastener acts as a fulcrum for the movement of the projecting edges of said strips of relatively stiff material toward each other in establishing a pressure contact between said bodies, and a second slide fastener including a second pair of elongated stringers each connected along one edge to a corresponding one of said strips of relatively stiff material along and adjacent the said projecting edges thereof, rows of fastener members along the other edges of said second stringers and a second slider adapted on movement along said last rows to couple and uncouple the fastener members thereof, said second slide fastener being proportioned to draw said projecting edges of said strips of relatively stiff material together on coupling said last rows of fastener members.

8. A slide fastener comprising a pair of generally parallel elongated rubber bodies adapted to be drawn into contact with each other to provide a sealed closure, a strip of relatively stiff material extending lengthwise of and having one edge embedded in each of said bodies and its opposite edge projecting laterally therefrom, said strips of relatively stiff material projecting in opposite directions from said bodies in divergent relation to each other and being sufficiently stiff to be capable of exerting a leverage action against said bodies, a slide fastener including a pair of elongated stringers each secured along one edge to a corresponding one of said strips of relatively stiff material and embracing one side of the corresponding rubber body, rows of fastener members along opposing edges of said stringers and a slider adapted on movement along said rows to couple and uncouple the fastener members thereof, and said slide fastener being positioned in spaced relation to the line of contact of said bodies and in a plane intersected by theoretical projections of said one edges of said strips of relatively stiff material and whereby said slide fastener acts as a fulcrum for the movement of said projecting edges of said strips of relatively stiff material toward each other in establishing a pressure contact between said bodies, and a second slide fastener including a second pair of elongated stringers each connected along one edge to a corresponding one of said strips of relatively stiff material along and adjacent the said projecting edge thereof, rows of fastener members along the other edges of said second stringers and a second slider adapted on movement along said last rows to couple and uncouple the fastener members thereof, said second slide fastener being proportioned to draw said projecting edges of said strips of relatively stiff material together on coupling said last rows of fastener members.

9. A slide fastener comprising a pair of generally parallel elongated bodies formed of a strip of fibrous material spirally wound about a longitudinal axis to provide a roll of substantial diameter, a strip of relatively stiff material arranged along one side of each of said rolls with one edge projecting laterally therefrom, a cover strip embracing each of said rolls and having its opposite edges secured to the corresponding one of said strips of relatively stiff material, said covered bodies being adapted to be drawn into contact with each other in providing a sealed closure, and said strips of relatively stiff material projecting in opposite directions from said bodies in divergent relation to each other and being sufficiently stiff to be capable of exerting a leverage action on said bodies, a slide fastener including a pair of elongated stringers extending along and each operatively connected to one of said bodies, rows of fastener members along opposing edges of said stringers and a slider adapted on movement along said rows to couple and uncouple the fastener members thereof, and said slide fastener being positioned in spaced relation to the line of contact of said covered bodies and in a plane intersected by theoretical projections of the adjacent edges of said strips of relatively stiff material and whereby said slide fastener acts as a fulcrum for the movement of said projecting edges of said strips of relatively stiff material toward each other in establishing pressure contact between said covered bodies, and a second slide fastener including a second pair of elongated stringers each connected along one edge to a corresponding one of said strips of relatively stiff material along and adjacent the said projecting edge thereof, rows of fastener members along the other edges of said second stringers and a second slider adapted on movement along said last rows to couple and uncouple the fastener members thereof, said second slide fastener being proportioned to draw said projecting edges of said strips of relatively stiff material together on coupling said last rows of fastener members.

10. A slide fastener comprising a pair of generally parallel elongated bodies formed of a strip of fibrous material spirally wound about a longitudinal axis to provide a roll of substantial diameter, a strip of relatively stiff material arranged along one side of each of said rolls with one edge projecting laterally therefrom, a cover strip embracing each of said rolls and having its opposite edges secured to the corresponding one of said strips of relatively stiff material, said covered bodies being adapted to be drawn into contact with each other in providing a sealed closure, and said strips of relatively stiff material projecting in opposite directions from said bodies in divergent relation to each other and being sufficiently stiff to be capable of exerting a leverage action on said bodies, a slide fastener including a pair of elongated stringers each secured along one longitudinal edge to the said projecting edge of the corresponding strip of relatively stiff material and embracing a side of one of said bodies, rows of fastener members along opposing edges of said stringers and a slider adapted on movement along said rows to couple and uncouple the fastener members thereof, and said slide fastener being positioned in spaced relation to the line of contact of said covered bodies and in a plane intersected by theoretical projections of the adjacent edges of said strips of relatively stiff material and whereby said slide fastener acts as a fulcrum for the movement of said projecting edges of said strips of relatively stiff material toward each other in establishing pressure contact between said covered bodies, and a second slide fastener including a second pair of elongated stringers each connected along one edge to a corresponding one of said strips of relatively stiff material along and adjacent the said projecting edge thereof, rows of fastener members along the other edges of said second stringers and a second slider adapted on movement along said last rows to couple and uncouple the fastener members thereof, said second slide fastener being proportioned to draw said projecting edges of said strips of relatively stiff material together on coupling said last rows of fastener members.

JAMES A. COOK.

REFERENCES CITED

The following references are of record in the file of this patent:

UNITED STATES PATENTS

| Number | Name | Date |
| --- | --- | --- |
| 2,119,621 | Ferrone | June 7, 1938 |

FOREIGN PATENTS

| Number | Country | Date |
| --- | --- | --- |
| 364,703 | Italy | of 1938 |
| 396,589 | Great Britain | of 1933 |
| 507,178 | Germany | of 1930 |
| 557,418 | Great Britain | of 1943 |
| 804,409 | France | of 1936 |